(12) United States Patent
Mochizuki

(10) Patent No.: US 7,728,913 B2
(45) Date of Patent: Jun. 1, 2010

(54) ELECTRO-OPTICAL DEVICE AND ELECTRONIC APPARATUS

(75) Inventor: Hiroaki Mochizuki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 991 days.

(21) Appl. No.: 11/486,910

(22) Filed: Jul. 14, 2006

(65) Prior Publication Data

US 2007/0171162 A1 Jul. 26, 2007

(30) Foreign Application Priority Data

Jul. 15, 2005 (JP) ............................. 2005-207562
May 25, 2006 (JP) ............................. 2006-145732

(51) Int. Cl.
*H04N 5/50* (2006.01)
*G09G 3/36* (2006.01)
*G02F 1/1339* (2006.01)

(52) U.S. Cl. .......................... 348/744; 345/87; 349/153

(58) Field of Classification Search ................ 348/744, 348/756, 792; 345/87, 98, 100, 92, 90; 349/100, 349/153, 149, 155, 152

See application file for complete search history.

(56) References Cited

U.S. PATENT DOCUMENTS

| | | | | |
|---|---|---|---|---|
| 6,262,702 B1 * | 7/2001 | Murade | ........................ | 345/87 |
| 6,483,493 B2 * | 11/2002 | Murade | ........................ | 345/87 |
| 6,654,083 B1 * | 11/2003 | Toda et al. | ................... | 349/110 |
| 6,703,997 B2 * | 3/2004 | Murade | ........................ | 345/92 |
| 6,750,937 B2 * | 6/2004 | Karasawa et al. | ............ | 349/153 |
| 7,205,572 B2 | 4/2007 | Suh | | |
| 7,480,026 B2 * | 1/2009 | Fujita | ......................... | 349/149 |

FOREIGN PATENT DOCUMENTS

| | | |
|---|---|---|
| CN | 1242842 | 1/2000 |
| CN | 1615056 | 5/2005 |
| JP | 8-286201 A | 11/1996 |
| JP | 10-253990 A | 9/1998 |
| JP | 11-202366 A | 7/1999 |
| JP | 2002-72238 A | 3/2002 |
| JP | 2003-121870 A | 4/2003 |

* cited by examiner

*Primary Examiner*—Paulos M Natnael
(74) *Attorney, Agent, or Firm*—AdvantEdge Law Group, LLC

(57) ABSTRACT

An electro-optical device comprising an image signal line that supplies an image signal to a sampling circuit, the image signal line extending from an image signal terminal, bypassing a data line driving circuit, and reaching the sampling circuit. The image signal line has a first straight line portion extending in one direction, a second straight line portion extending in another direction, and an intermediate wiring portion connecting the first straight line portion and the second straight line portion. An angle of a corner formed between the first straight line portion, the second straight line portion, and the intermediate wiring portion is an obtuse angle. The intermediate wiring portion is wired to pass around a vertical conduction terminal. Detailed information on various example embodiments of the inventions are provided in the Description of Exemplary Embodiments below, and the inventions are defined by the appended claims.

5 Claims, 5 Drawing Sheets

ELECTRO-OPTICAL DEVICE AND ELECTRONIC APPARATUS

BACKGROUND

1. Technical Field

The present invention relates to an electro-optical device such as, for example, a liquid crystal device, and to an electronic apparatus such as, for example, a liquid crystal projector, which incorporates the electro-optical device.

2. Related Art

According to JP-A-10-253990, in an electro-optical device, an electro-optical material is disposed between a pair of substrates, and image signals rather than data signals are supplied to pixel electrodes formed for each pixel of a pixel array region or an image display region on one substrate. An image is displayed by applying a voltage that is defined by a potential between a counter electrode and each of the pixel electrodes formed on the other substrate.

Here, in a peripheral region of the image display region on the one substrate, a sampling circuit for supplying an image signal via an image signal line to a data line by sampling, a data driving circuit for subsequently outputting an output of a shift register as a driving signal to the sampling circuit, and a scanning line driving circuit for subsequently supplying the scanning signals to the scanning lines are provided. The plurality of image signals which have undergone serial-parallel conversion are supplied to the plurality of data lines in units of blocks so as to mainly suppress a driving frequency. In this case, each of the plurality of image signal lines is wired to bypass the data line driving circuit in the vicinity of the data line driving circuit from an external circuit connecting terminal to the sampling circuit. Accordingly, each of the image signal lines has a plurality of bent portions that are vertically bent at the periphery of the data line driving circuit to bypass the data line driving circuit.

Further, vertical conduction terminals are formed, for example, at the periphery of the four corners of the pixel array region so that electrical conduction with the counter substrate, that is, vertical conduction is realized at the peripheral region of the one substrate. In addition, a vertical conduction between the substrates is achieved through a vertical conduction material which includes a conductive paste between a portion opposite to the vertical conduction terminal and the vertical conduction terminal on the counter electrode formed on the one surface of the counter substrate.

However, in the electro-optical device described above, when miniaturization is attempted by changing the size of either side or both sides of the pair of substrates while a current plane layout is maintained for the sampling circuit, the data line driving circuit, the plurality of image signal lines, and, in addition, the vertical conduction terminal, since it is necessary to secure a space for disposing a variety of components described above in the peripheral region of the one substrate, the miniaturization may be difficult. In this case, for example, a substantial design change in the layout of the data line driving circuit may be necessary at the peripheral region of the one substrate, however there may be a possibility of rising in new problems such as an increase in manufacturing cost and a miniaturization which are caused by a change in design.

Further, since noise is generated by an electric field of a vertical bent part being stronger than that of the other linearly wired parts, deterioration of a displayed image quality may occur due to the noise on a display screen.

SUMMARY

An advantage of some aspects of the invention is that it provides an electro-optical device suitable for miniaturization and capable of displaying a high-quality image and an electronic apparatus which incorporates the same.

An electro-optical device according to an aspect of the invention an electro-optical device comprising a first substrate, a second substrate, and an electro-optical material between the first substrate and the second substrate, the first substrate comprising: a plurality of scanning lines and a plurality of data lines that intersect with each other, a plurality of pixel electrodes that are provided so as to correspond to the intersections of the plurality of scanning lines and the plurality of data lines, a sampling circuit that is disposed in a peripheral region positioned around the region in which the plurality of pixel electrodes are arranged, so as to correspond to the plurality of data lines disposed along an extending direction of a first side of the first substrate, a data line driving circuit that is disposed in the peripheral region and closer to the first side than the sampling circuit so as to supply a driving signal to the sampling circuit, at least one image signal terminal disposed in the peripheral region and closer to the first side than the data line driving circuit, the image signal terminal being supplied with a image signal externally, an image signal line that supplies the image signal to the sampling circuit, the image signal line extending from the image signal terminal, bypassing the data line driving circuit, and reaching the sampling circuit, and a vertical conduction terminal disposed near a second side intersecting with the first side of the first substrate, in the peripheral region, vertical conduction terminal enabling electrical conduction between the first substrate and the second substrate, wherein the image signal line has a first straight line portion extending in a direction of the second side and a second straight line portion extending in the direction of the first side, and an intermediate wiring portion connecting the first straight line portion and the second straight line portion, an angle of a corner formed between each of the first straight line portion and the second straight line portion and the intermediate wiring portion is an obtuse angle, and the intermediate wiring portion is wired to pass around the vertical conduction terminal.

According to the electro-optical device of the present invention, during the operation, an image is displayed by applying an applied voltage defined by each pixel potential of the pixel electrodes formed on one substrate such as an element substrate or a TFT array substrate of the pair of substrates and the other counter electrode formed on the other substrate such as the counter substrate, on the electro-optical material (for example, a liquid crystal) which is disposed between the pair of substrates. At this time, for example, each scanning line to which the scanning signal is supplied is selected, and the image signal is supplied to the pixel electrode that is electrically connected to the selected scanning line by interposing the data line and a switching element such as TFT (Thin Film Transistor) intermediated between the data line and the pixel electrode. More specifically, the image signal on the image signal line is sampled by the sampling circuit driven by the data line driving circuit is supplied on the data line, and the image signal is inputted into the pixel electrode at the time when the scanning signal is supplied by interposing, for example, the switching element provided on a pixel unit.

A plurality of external circuit connection terminals are disposed along the first side of the substrate (for example, along an X direction, or an extending direction of the scanning line, i.e. along the direction in which the plurality of data lines are arranged). The plurality of external circuit connection terminals include at least one image signal terminal to which the image signal is inputted externally or from an external circuit. Further, the data line driving circuit or the sampling circuit is disposed in the region near by the first side as viewed from the region (that is, for example, the pixel array region or the image display region) in which the pixel electrode is arranged of the peripheral regions or along the first side mentioned above. The data line driving circuit or the sampling circuit has a plane shape extending rectangularly along the first side.

Here, since the image signal line supplying the image signal to the sampling circuit is also wired to the peripheral region, and the image signal line is extended to the sampling circuit by bypassing the periphery of the data line driving circuit from the image signal terminal against a restriction of a wiring layer constituting the peripheral region. On the other hand, the vertical conduction terminal for taking an electrical vertical conduction in the pair of the substrates is disposed close to the second side (for example, of the sides of the substrates, Y direction or extending direction of the data line, i.e. the side near the side of the substrate along the direction in which the plurality of data lines are arranged) that is adjacent to the first side of the substrate as viewed from the sampling circuit of the peripheral regions. Moreover, the vertical conduction terminals are arranged to avoid the image signal line as viewed in plan against the restriction of the wiring layer constituting the same. That is, the image signal line is disposed around the vertical conduction terminal as viewed in plan.

Accordingly, in order to reduce the peripheral region under the request for miniaturizing the electro-optical device, the vertical conduction terminal may be an obstacle to the image signal line for bypassing the data line driving circuit and passing aside the vertical conduction terminal. Meanwhile, in order to reduce the peripheral region, the image signal line bypassing the data line driving circuit and passing aside the vertical conduction terminal may be the obstacle to the vertical conduction terminal. Moreover, as described in the "Technical Field", since the image signal line passing aside the vertical conduction terminal bypasses with being perpendicularly curved to the straight line portion that is extended in the first side direction from the straight line portion that is extended in the second side direction and the perpendicularly curved portions exist on the aside of the vertical conduction terminals, the degree of interfering each other as described above increases extremely. In addition, the perpendicularly curved portions may cause deterioration in an image display quality since the noise is formed by the relatively strong electric field as described above.

However, in the present invention, in particular, the image signal line has the intermediate wiring portion that is bent twice in obtuse angle when the line is bent from the one straight line portion extended in the second side direction (i.e., along the direction that the second side extends or along the second side) to the other straight line portion extended in the first side direction (i.e., along the direction in which the first side extends or along the first side) in the portions passing the vertical conduction terminals. Accordingly, since it is possible to make the angular portions of the image signal lines, which is perpendicularly angled, not to exist, the space for disposing the vertical conduction terminals can be secured, in a planar layout. On the contrary, since it is possible to wire the image signal line to bypass the data line driving circuit and pass aside the vertical conduction terminal without a perpendicular angular portion, the space for wiring the image signal line can be secured nearby the vertical conduction terminal, in the planar layout. That is, it is possible to reduce the size of the space that is needed when wiring the vertical conduction terminal and the image signal line. Accordingly, each of the pair of substrates can be miniaturized as large as the space reduced in size.

At this time, by changing the curving form relative to a part of the image signal line and disposing position of the vertical conduction terminal, it is possible to miniaturize the electro-optical device by miniaturizing each of the pair of substrates. For example, it is accomplished without performing drastic design change, for example, the changing overall layout of the image signal line besides changing the disposition of a variety of components such as the data line driving circuit.

Further, since the image signal line is bent at the obtuse angle for at least twice when the line is bent from the one of straight line portion extended in the second side direction to the other straight line portion extended in the first side direction, the electric field generated in the portions related to the bent and curved portion, that is, the curved portion, can be reduced compared to the wiring layout that is perpendicularly bent at a time. With this, it is possible to prevent the generation of the noise for the image signal line and perform the image display having high quality for the electro-optical device.

As a result, according to the electro-optical device of the present invention, it is possible to miniaturize the device and in addition to perform image display having the high quality.

In the electro-optical device, the vertical conduction terminal has a planar shape in which a side facing the intermediate wiring portion extends along the intermediate wiring portion as viewed in plan from the first substrate.

According to the aspect of the present invention, the image signal line has the intermediate wiring portion in the parts passing aside the vertical conduction terminal, and the vertical conduction terminal has a planar shape in which the side facing the intermediate wiring portion extends along the intermediate wiring portion. In other words, the vertical conduction terminal has the planar shape in which the corner that is typically or traditionally perpendicular is cut with being slightly oblique in the side facing the intermediate wiring portion. Therefore, since the image signal line has the portion that is closest to the vertical conduction terminal as the line not as the points in the vicinity of the angular portion, it is possible to secure the space for disposing the vertical conduction terminal more effectively. On the contrary, since the image signal line can be wired to pass aside the vertical conduction terminal having the planar shape extending along the intermediate wiring portion in the intermediate wiring portion, the space for wiring the image signal line can be secured near the vertical conduction terminal more effectively in the planar layout.

At this time, since it is possible to miniaturize each of the pair of substrates by changing the vertical conduction terminal, thereby miniaturizing the electro-optical device, it is considerably advantageous for the practical use.

As described above, the meaning of 'extending along' according to the present invention is termed with an intention for including the case in which the side facing the intermediate wiring portion of the vertical conduction terminal is formed to be close to the intermediate wiring portion in the at least one portion other than the case having the side portion for being completely perpendicular to the intermediate wiring portion.

In the electro-optical device, the vertical conduction terminal is formed at a position opposite to a corner adjacent to an angular portion formed by the first side and the second side of the four corners of the first substrate.

According to the form described above, since it is possible to secure the space for disposing the vertical conduction terminal effectively on one corner of the one substrate, the space for wiring the image signal line can be secured effectively. Here, since it is possible to miniaturize each of the pair of substrates by changing the wiring layout of the image signal line without changing the conventional disposition of the vertical conduction terminal, thereby miniaturizing the electro-optical device, it is considerably advantageous for the practical use.

In the electro-optical device, the image signal is formed of N image signals that are converted from serial to parallel (N being a natural number greater than or equal to 2), the image signal line is formed of N image signal lines disposed in parallel, which supply each of the N image signals, and each of the N image signal lines has the intermediate wiring portions disposed between the first straight line portion and the second straight line portion.

According to the aspect of the invention, it is possible to supply the image signal corresponding to the plurality of data line simultaneously by using the image signal converted to serial-parallel. That is, it is possible to simultaneously drive the image signal line of N-series, thereby preventing the driving frequency. Here, particularly, since each of the image signal line of N-series has intermediate wiring portions in the portions passing aside the vertical conduction terminal, the operative effect obtainable from the image signal line according to the invention described above occurs more frequently.

As described above, in addition to the image signal line, the wiring for passing aside the vertical conduction terminal with being curved can be formed to have the intermediate wiring portion as that of the case of the image signal line according to the present invention. For example, the same intermediate wiring portion as that of the case of the image signal line is provided on the curved portion such as power source line or feedback wiring, in the space provided by means of that, whereby the vertical conduction terminal may be disposed. Further, even in this case, it is more preferable that the vertical conduction terminal has the planar shape in which the side facing the intermediate wiring portion extends along the intermediate wiring portion as viewed in plan.

An electronic apparatus according to another aspect of the invention comprises the above-described electro-optical device (however, the aspects are included).

Since the electronic apparatus of the invention includes the above-described electro-optical devices of the invention, various electronic apparatuses, such as projection display devices, televisions, cellular phones, electronic diaries, word processors, view-finder or monitor direct-view-type video cassette recorders, workstations, videophones, POS terminals, and touch panels can be achieved, all of which can achieve a high-quality image display as well as miniaturizing the device. Also, the display device using a liquid crystal device, an electrophoretic device such as an electronic paper, and an EL (electroluminescence) device, and the like can be achieved as the electro-optical device of the invention.

Such operations and other advantages according to the invention will be apparent from the embodiments described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the accompanying drawings. In each of the embodiments, an electro-optical device of the present invention is applied to a liquid crystal device.

Figure 1:
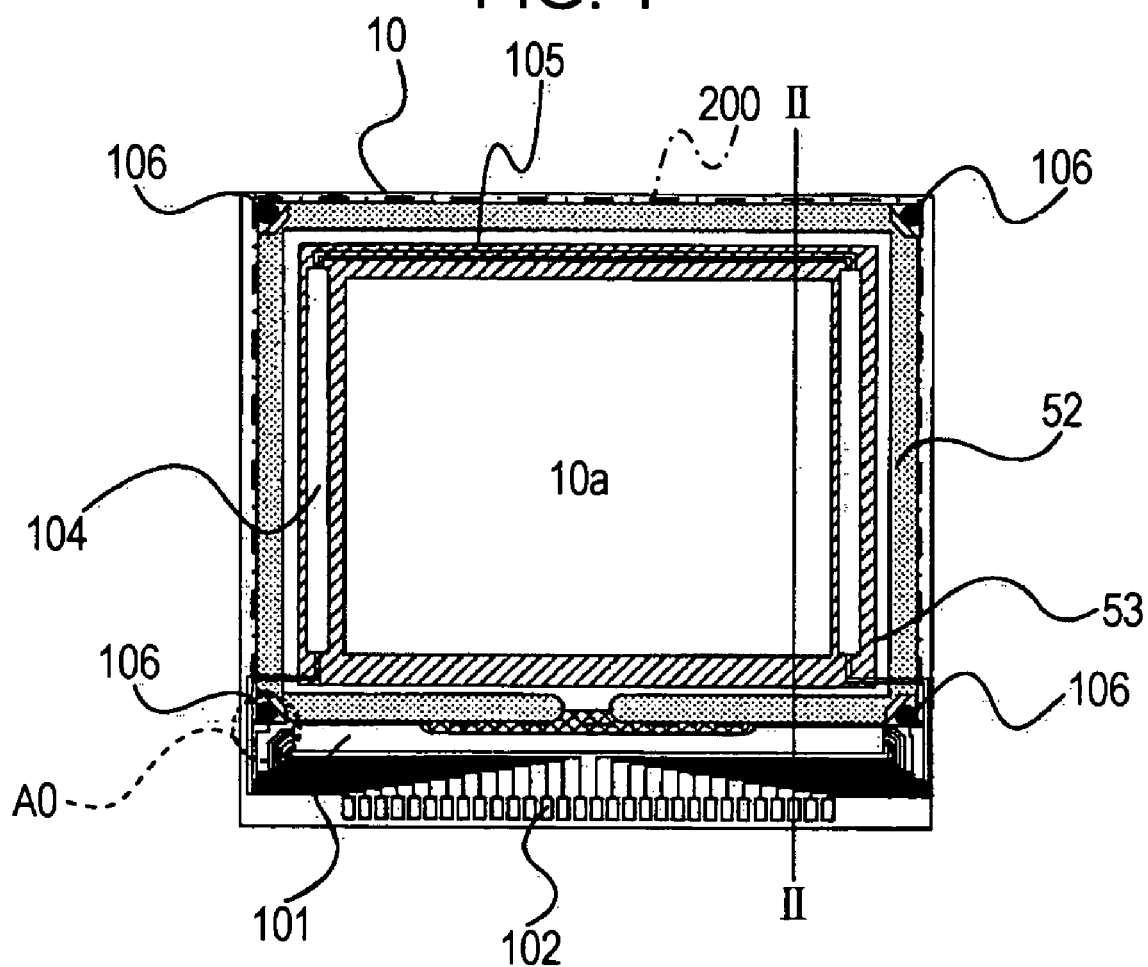
FIG. 1 is a plan view showing the overall configuration of an electro-optical device according to this embodiment of the invention.
Figure 2:
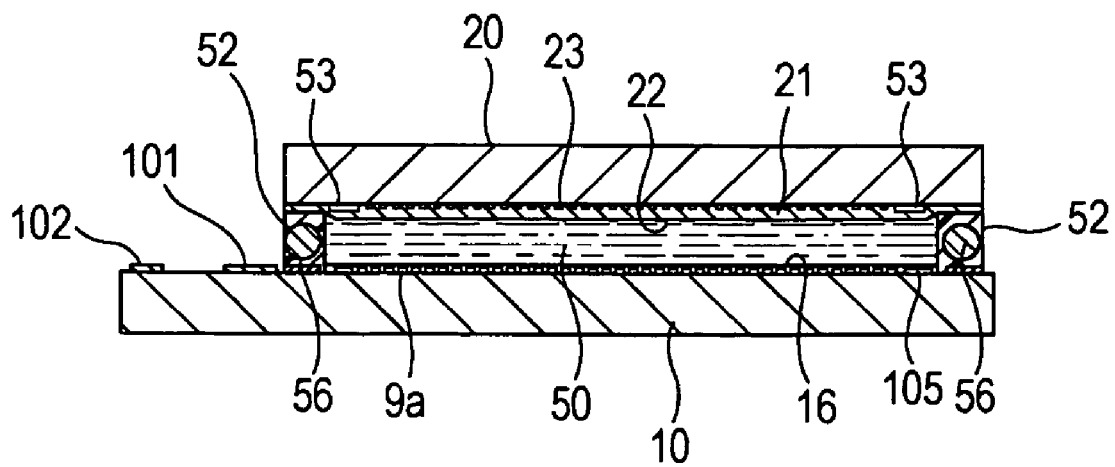
FIG. 2 is a cross-sectional view taken along line H-H' shown in FIG. 1.
Figure 3:
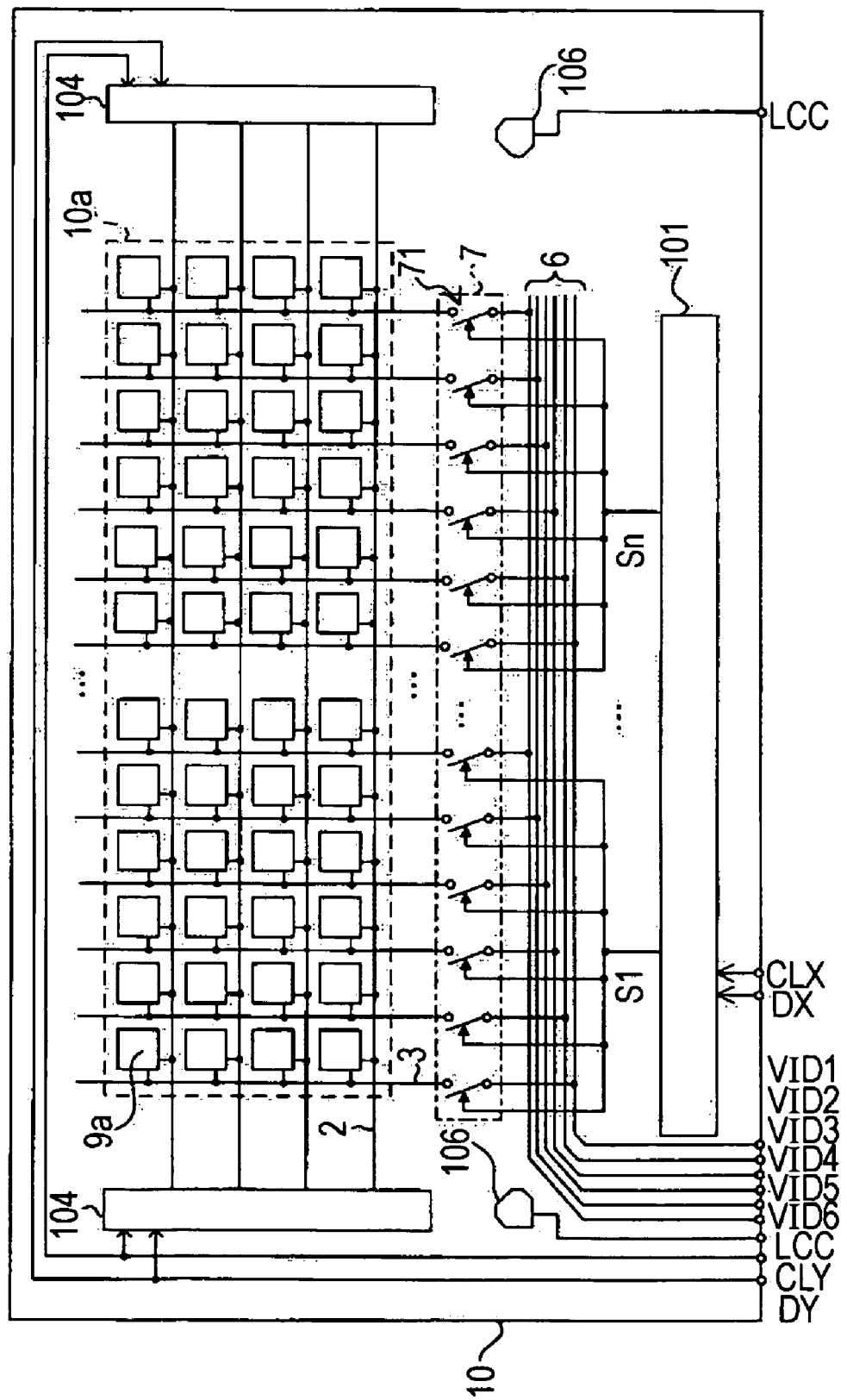
FIG. 3 is a block diagram showing an electrical configuration of an electro-optical device.

First, the whole configuration of a liquid crystal device according to embodiments of the invention will be described with reference to FIGS. 1 to 3. FIG. 1 is a plan view showing a liquid crystal device as viewed from a counter substrate side, and FIG. 2 is a cross-sectional view taken along the line H-H' shown in FIG. 1. Further, FIG. 3 is a block diagram showing an electrical configuration of a liquid crystal device. Moreover, in FIG. 2, the dimensions of layers and members have been adjusted to make the layers and members recognizable in the drawings.

In FIGS. 1 and 2, a liquid crystal device comprises a TFT array substrate 10 and a counter substrate 20 which are disposed opposite to each other. Since a liquid crystal layer 50 is sealed between the TFT array substrate 10 and the counter substrate 20 which are, for example, made of a quartz, a glass and silicon, the TFT array substrate 10 and the counter substrate 20 are bonded together with a sealing material 52 provided in a seal region disposed around an image display region 10a. Further, an example of the position at which the counter substrate 20 is disposed in relation to the TFT array substrate 10 is shown by a dotted line 200. In this manner, the counter substrate 20 is disposed on the TFT array substrate 10 so that the circumference lies along the periphery of the seal region, and the vertical conduction terminal 106 formed on the TFT array substrate 10 is disposed at each of the four corners of the substrate.

In order to bond the TFT array substrate 10 and the counter substrate 20 together, the sealing material 52 comprises, for example, an ultraviolet curing resin, a thermal curing resin, or the like. The sealing material 52 is coated on at least one of the TFT array substrate 10 or the counter substrate 20, and then cured by ultraviolet irradiation, heating, or the like in the manufacturing process. Furthermore, the sealing material 52 may comprise gap materials 56 such as glass fibers or glass beads to be dispersed therein, for setting the gap between the TFT array substrate 10 and the counter substrate 20 to a predetermined value.

A light-shielding frame-shaped film 53 which defines the image display region 10a is provided on the side of counter substrate 20 in parallel with the inner side of the seal region in which the sealing material 52 is disposed. However, the light-shielding frame-shaped film 53 may be provided as a built-in light-shielding film over part of or the entirety of the TFT array substrate 10.

In the peripheral region of the image display region 10a on the TFT array substrate 10, a data line driving circuit 101 and external circuit connection terminals 102 are provided along one side of the TFT array substrate 10. A scanning line driving circuits 104 are provided along two sides of the TFT array substrate 10 adjacent to the one side of the TFT array substrate 10 so as to be covered by the light-shielding frame-shaped film 53. In addition, a plurality of wirings 105 are provided on the remaining side of the TFT array substrate 10 to be covered by the light-shielding frame-shaped film 53 so as to connect the scanning line driving circuits 104 provided on the two sides of the image display region 10a.

Vertical conduction terminals 106 are provided on the TFT array substrate 10 corresponding to at least one end of the two sides of the image display region 10a. Electrical conduction can be obtained between the TFT array substrate 10 and the counter substrate 20 by means of the vertical conduction terminals 106. FIG. 1 shows a configuration in which vertical conductive terminals 106 are provided at the four corners of the image display region 10a.

In FIG. 2, on the TFT array substrate 10, a pixel electrode 9a is formed on the upper layer of each of the pixel switching TFTs or various types of wiring or the like, and an oriented film 16 is formed on the upper layer. Moreover, the pixel switching element may be constituted by various types of transistors or TFDs rather than TFTs.

On the other hand, counter electrodes 21 facing the plurality of pixel electrodes 9a are formed in the image display region 10a on the counter substrate 20 through the liquid crystal layer 50. That is, a liquid-crystal-retaining capacitance is formed between each pair of the pixel electrodes 9a and the counter electrodes 21 due to the voltage supplied thereto. A light-shielding film 23 having a lattice shape or stripe shape is formed on the lower layer of the counter electrodes 21 (that is, above the counter electrodes 21 in FIG. 2), so that the light shielding film 22 covers the counter electrodes 21.

A light-shielding film 16 or the light-shielding film 22 formed on the TFT array substrate 10 or the counter substrate 20 is composed of an organic material such as polyimide or the like. In this embodiment, the light shielding film may be formed on either the TFT array substrate 10 or the counter substrate 20, or the light shielding film may be formed of an inorganic material.

The liquid crystal layer 50 is formed of, for example, one type of nematic liquid crystal or several types of nematic liquid crystals mixed together, and a predetermined orientation state is obtained between a pair of the oriented films.

Although not shown in this embodiment, besides the data line driving circuit 101 and the scanning line driving circuits 104, a pre-charge circuit for supplying a pre-charge signal of a predetermined voltage level to each of the plurality of data lines prior to an image signal, and an inspection circuit for inspecting the quality and defects of the electro-optical device in the course of manufacture and at the time of shipment may be formed on the TFT array substrate 10.

Next, the electrical configuration of the above-mentioned liquid crystal device will be described with reference to FIG. 3. In FIG. 3, the liquid crystal device has a configuration for controlling the voltage applied to the pixel electrodes 9a that are disposed in an array in the image display region 10a in which the TFT array substrate 10 and the counter substrate 20 (not shown) are disposed to face each other through the liquid crystal layer, and for modulating the electric field formed on the liquid crystal layer for each pixel. Accordingly, the amount of light transmitted between the substrates is controlled, thereby permitting a gray-scale display of an image. Moreover, in this embodiment, the liquid crystal device uses the TFT active matrix driving system.

A plurality of pixel electrodes 9a disposed in matrix and a plurality of scanning lines 2 and a plurality of data lines 3 arranged so as to intersect each other are formed on the image display region 10a in the TFT array substrate 10, whereby pixel units corresponding to the pixels are provided. Further, although not shown in this embodiment, a TFT as a pixel switching element in which the conduction and non-conduction is controlled in accordance with the scanning signal that is supplied through the scanning line, or a storage capacitance for storing charge corresponding to the voltage applied to the pixel electrode 9a is formed between each pair of the pixel electrodes 9a and the data lines 3. Further, a driving circuit such as the data line driving circuit 101 is formed on the peripheral region of the image display region 10a.

The data line driving circuit 101 includes a shift register, a buffer, a lever shifter and the like, and sequentially supplies a transmitted signal to a sampling circuit 7 as a sampling circuit driving signal based on an output of the shift register. More specifically, the data line driving circuit 101 is constituted to subsequently produce and output a sampling signal Si (i being from 1 to n) from the each of the stages based on an X side clock signal CLX (and the opposite signal CLXB) and an X start pulse DX.

The sampling circuit 7 includes a plurality of sampling switches 71 provided in the data lines 3. Each of the sampling switches 71 samples any one of image signals VID1 to VID6 supplied from the external circuit connection terminal 102 through the image signal line 6 as shown in FIG. 3 according to the sampling signal Si output from the data line driving circuit 101, and then supplies the image signal to the corresponding data line 3. Each of the switches 71 is formed of a fragmentary-type channel TFT such as one of a P channel type or an N channel type, or a complementary-type TFT.

Here, image signals VID1 to VID6 undergo serial-parallel conversion in N phases, that is, six phases (N=6) in this embodiment, when supplied from the external circuit not shown in FIG. 3 to the external circuit connection terminal 102. These six image signals VID1 to VID6 are input to the sampling circuit 7 through a corresponding one of six image signal lines 6 formed in accordance with the image signals VID1 to VID6. In addition, the six image signal lines 6 are formed so as to be curved around the data line driving circuit 101 toward the other end that is electrically connected to the data line driving circuit 101 from the one end that is electrically connected to the external circuit connection terminal 102 in the peripheral region on the TFT array substrate 10.

Accordingly, in this embodiment, the plurality of data lines 3 wired to the image display region 10a are driven in data line groups each having six data lines based on six image signals VID1 to VID6. Therefore, by simultaneously supplying the parallel image signals obtained by converting the serial image signals to the plurality of image signal lines 6, the driving frequency is suppressed.

The scanning line driving circuit 104 is configured to sequentially apply the scanning signal generated on the basis of a Y clock signal CLY (and the opposite signal CLYB) that is a reference clock applied to the scanning signal and a Y start pulse DY to the plurality of scanning lines 2 so as to scan the plurality of pixel electrodes 9a disposed in matrix in the direction in which the scanning lines 2 are disposed with the image signal and the scanning signal. At this time, in FIG. 3, a voltage from both ends is simultaneously applied to each of the scanning lines 2.

Accordingly, when the electro-optical device is driven, each of the scanning lines 2 is selected by supplying a scanning signal, and any one of image signals VID1 to VID6 rather than the data line 3 is supplied to the pixel electrode 9a electrically connected to the selected scanning line 2.

Moreover, various types of timing signals such as the clock signal CLX or CLY are generated in the timing generator formed on the external circuit and supplied through the external circuit connection terminal 102 to each of the circuits on the TFT array substrate 10. Further, power necessary for driving each driving circuit is also supplied from the external circuit.

Further, the counter electrode potential LCC is supplied from the external circuit to the signal line from the vertical conduction terminal 106. The vertical conduction material containing a conductive paste is disposed in a position corresponding to the vertical conduction terminal 106 between the counter substrate 20 and TFT array substrate 10, and the counter electrode potential LCC is supplied to the counter electrode 21 through the vertical conduction material rather than the vertical conduction terminal 106. The counter electrode potential LCC is a reference potential of the counter electrode 21 for maintaining a constant difference between the counter electrode potential LCC and the potential of the pixel electrodes 9a and forming the liquid-crystal-retaining capacitance.

Figure 4:
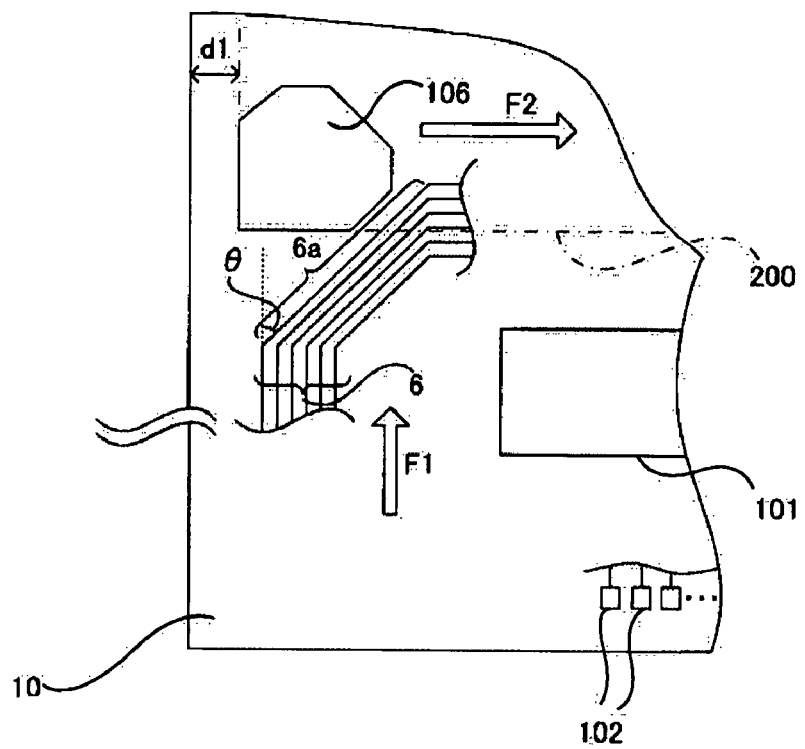
FIG. 4 is a schematic plan view showing a configuration of a part surrounded by a dotted line AO shown in FIG. 1.

Next, the distinctive configuration of the electro-optical device according to the embodiment will be described more specifically. FIG. 4 is a schematic plan view showing a configuration of image signal line 6 and the vertical conduction terminal 106, and a disposition relation between such components, and the TFT array substrate 10 and the counter substrate 20 in the part surrounded by the dotted line AO in FIG. 1.

In this embodiment, at least one part of each of the image signal lines 6 is wired around the data line driving circuit 101 from the one end of the image signal line 6 that is electrically connected to the external circuit connection terminal 102 to the other end of the image signal line 6 that is electrically connected to the data line driving circuit 101 with, the image signal line 6 being led from the first direction F1 extending from one side of the data line driving circuit 101 to the second direction F2 that is perpendicular to the first direction F1, as viewed in plan from the TFT array substrate 10. That is, each of the image signal lines 6 is led to the sampling circuit 7 (refer to FIG. 3) while bypassing the data line driving circuit 101. In addition, at least one part of the six image signal lines 6 is led to pass the intermediate wiring portion 6a and be bent in the second direction F2.

In this embodiment, the first direction F1 is designated as the Y direction or the extending direction of data lines 3, in other words, the direction in which the plurality of scanning lines 2 are arranged, and it corresponds to the second side direction according to the invention. The second direction F2 is designated as the X direction or the extending direction of the scanning line 2, in other words, the direction in which the plurality of data lines 3 are arranged, and it corresponds to the first side direction according to the invention. Further, the first side denotes the side toward the bottom of FIGS. 1, 3 and 4, and the second side denotes the side on the left in FIGS. 1, 3 and 4.

As shown in FIG. 4, it is preferable that all of six image signal lines 6 is led through the intermediate wiring portion 6a, which is one example of the wiring portion wired in an oblique direction, and are bent and led in the direction changing from the first direction F1 to the second direction F2. Here, the intermediate wiring portion 6a is formed so as to be led in the direction forming an acute angle that is an angle θ formed on a part of the image signal lines 6 extending in the first direction F1 and be connected to the other portion of the image signal lines 6 extending in the second direction F2 as viewed in plan from the TFT array substrate 10. Therefore, the image signal lines 6 in the parts passing the vertical conduction terminal 106 are bent twice in an obtuse angle when those are bent to the other straight line portion along the first direction F1 from the straight line portion along the second direction F2.

In other words, the image signal lines 6 comprise the intermediate wiring portion 6a connecting the straight line portion of the first direction and the straight line portion of the second direction, and the angle of the corner formed by each of the intermediate wiring portions 6a of the first and the second direction is an obtuse angle.

In addition, in the peripheral region of the TFT array substrate 10, the vertical conduction terminal 106 disposed at one corner of the image display region 10a is provided adjacent to one image signal line 6 having the intermediate wiring portion 6a of six image signal lines 6. The vertical conduction terminal 106 has a side disposed along the intermediate wiring portion 6a of the adjacent image signal line 6 adjacent to the TFT array substrate 10 as viewed in plan. In other words, the vertical conduction terminal 106 has a planar shape whose side facing the intermediate wiring portion 6a extends along the intermediate wiring portion 6a as viewed in plan. That is, the vertical conduction terminal 106 has a planar shape in which the angular portion that is conventionally perpendicular is cut so as to be slightly tilted on the side facing the intermediate wiring portion 6a.

That is, in this embodiment, in the periphery of the data line driving circuit 101, the image signal line 6 adjacent to at least the vertical conduction terminal 106 of six image signal lines 6 is formed to pass the intermediate wiring portion 6a and be bent in the direction changing from the first direction F1 to the second direction F2, so that the space for disposing the vertical conduction terminal 106 is secured. In addition, in such space, the vertical conduction terminal 106 having the planar shape whose one side extends along the intermediate wiring portion 6a is disposed.

Figure 5:
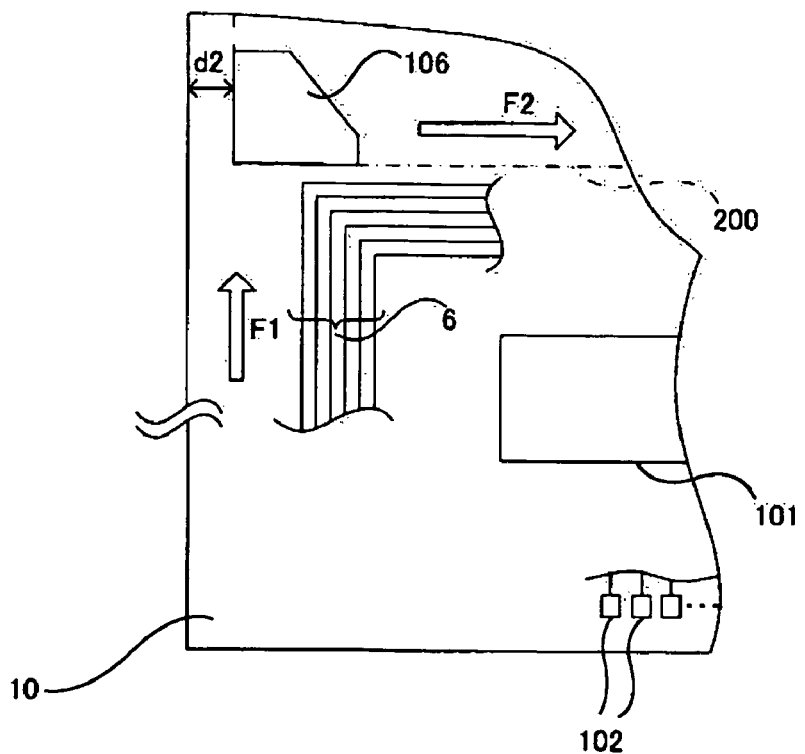
FIG. 5 is a schematic plan view showing a configuration of a comparative example.

FIG. 5 is a schematic plan view showing a configuration of a comparative example corresponding to FIG. 4. In the comparative example, at least a part of each of the image signal lines 6 is wired to be bent and led the periphery of the data line driving circuit 101 in perpendicular to the direction of from the first direction F1 to the second direction F2, from one end to the other end on the TFT array substrate 10 as viewed in plan.

According to the configuration of the embodiment shown in FIG. 4 compared to the configuration of the image signal line 6 shown in FIG. 5, the space for disposing the vertical conduction terminal 106 and the respective image signal lines 6 can be reduced. Accordingly, each of the TFT array substrate 10 and the counter substrate 20 can be miniaturized as much as the space reduced in size.

That is, in this embodiment, in the periphery region of the TFT array substrate 10, by changing the curving form relative to a part of the respective image signal lines 6 and disposing position of the vertical conduction terminal 106, it is possible to miniaturize the each of the TFT array substrate 10 and the counter substrate 20, without performing drastic design change such as the changing overall layout of the respective image signal lines 6 besides changing the disposition of various kinds of components such as the data line driving circuit 101.

Since it becomes further possible to provide a space at the periphery of the curved portion that is bent in the direction of from the first direction F1 to the second direction F2 in six image signal lines 6 by wiring all of six image signal lines 6 to pass the intermediate wiring portion 6a and be bent in the direction of from the first direction F1 to the second direction F2, the other wirings which are wired in a peripheral region on the TFT array substrate 10 can be disposed. Therefore, in the periphery region of the TFT array substrate 10, since it is possible to reduce the space for disposing the vertical conduction terminal 106 or a variety of wirings, each of the TFT array substrate 10 and the counter substrate 20 can be more miniaturized.

Here, the disposing position of the counter substrate 20 in relation to the TFT array substrate 10 is shown in a dotted line 200 in FIGS. 4 and 5 in a same manner to FIG. 1. In FIG. 5, in order to dispose the end portion of the counter substrate 20 and the end portion of the TFT array substrate 10 with the distance d2 of, for example, 400 μm therebetween, and to dispose the vertical conduction 106 on the right portion of the counter substrate 20, the counter substrate 20 is disposed in relation to the TFT array substrate 20.

By this configuration, in FIG. 4 in accordance with the configuration shown in FIG. 5, since it is possible to reduce the size of the TFT array substrate 10 or the counter substrate 20 as well as the TFT array substrate 10 as much as the space for disposing the vertical conduction terminal 106 and wiring the respective image signal lines 6, the distance d1 between the end portion of the counter substrate 20 and the end portion of the TFT array substrate 10 can be set to, for example, approximately 300 μm. In this embodiment, it is possible to reduce the size of the counter substrate 20 as well as the TFT array substrate without changing the disposing position of the counter substrate 20 relative to the TFT array substrate 20. Accordingly, the vertical conduction terminal 106 is disposed still on the right portion of the counter substrate 20, even after performing the size change as described above.

By configuration shown in FIG. 5, since a relatively stronger electric field than that of the other straight line wiring portion is generated in the curved portion that is bent perpendicularly in from the first direction F1 to the second direction F2, the noise may occur.

However, in this embodiment, since the respective image signal lines 6 are formed to pass the intermediate wiring portion 6a and be bent by interposing the angular portion having the obtuse angle formed from the first direction F1 to the second direction F2, it is possible to prevent the generation of the relatively strong electric field in the respective image signal lines 6. Therefore, the generation of the noise in the respective image signal lines 6 can be prevented.

Accordingly, in this embodiment, it is possible to miniaturize the electro-optical device as well as perform the image display having a high quality.

In this embodiment described above, on the TFT array substrate 10, it is preferable that each of the vertical conduction terminals 106 disposed at the four corners of the image display region 10a is formed to have substantially same shape as viewed in plan.

By this configuration, in the peripheral region on the TFT array substrate 10, it is possible to dispose the other vertical conduction terminal 106 like the vertical conduction terminal 106 disposed close to the image signal line 6 at the periphery of the data line driving circuit 101, of the vertical conduction terminals 106 disposed at the four corners of the image display region 10a. That is, the intermediate wiring portion similar to the case of the image signal line 6, is provided on the other wirings wired adjacent to the other vertical conduction terminals 106, for example, the curved portion such as a power source line or a feedback wiring, whereby the vertical conduction terminals 106 can be disposed in the space provided by means of that.

Accordingly, in the periphery region of the TFT array substrate 10, since it is possible to reduce the space for disposing the vertical conduction terminal 106 and wirings, each of the TFT array substrate 10 and the counter substrate 20 can be further miniaturized.

Furthermore, since it is possible to reduce the curved portions bent perpendicularly to the other wirings described above, the relatively stronger electric field can be prevented in such curved portions. Accordingly, it is possible to prevent the generation of the noise in the other wirings.

Next, an embodiment that the electro-optical device according described above is applied to a variety of electronic apparatuses will be described.

Projector

Figure 6:
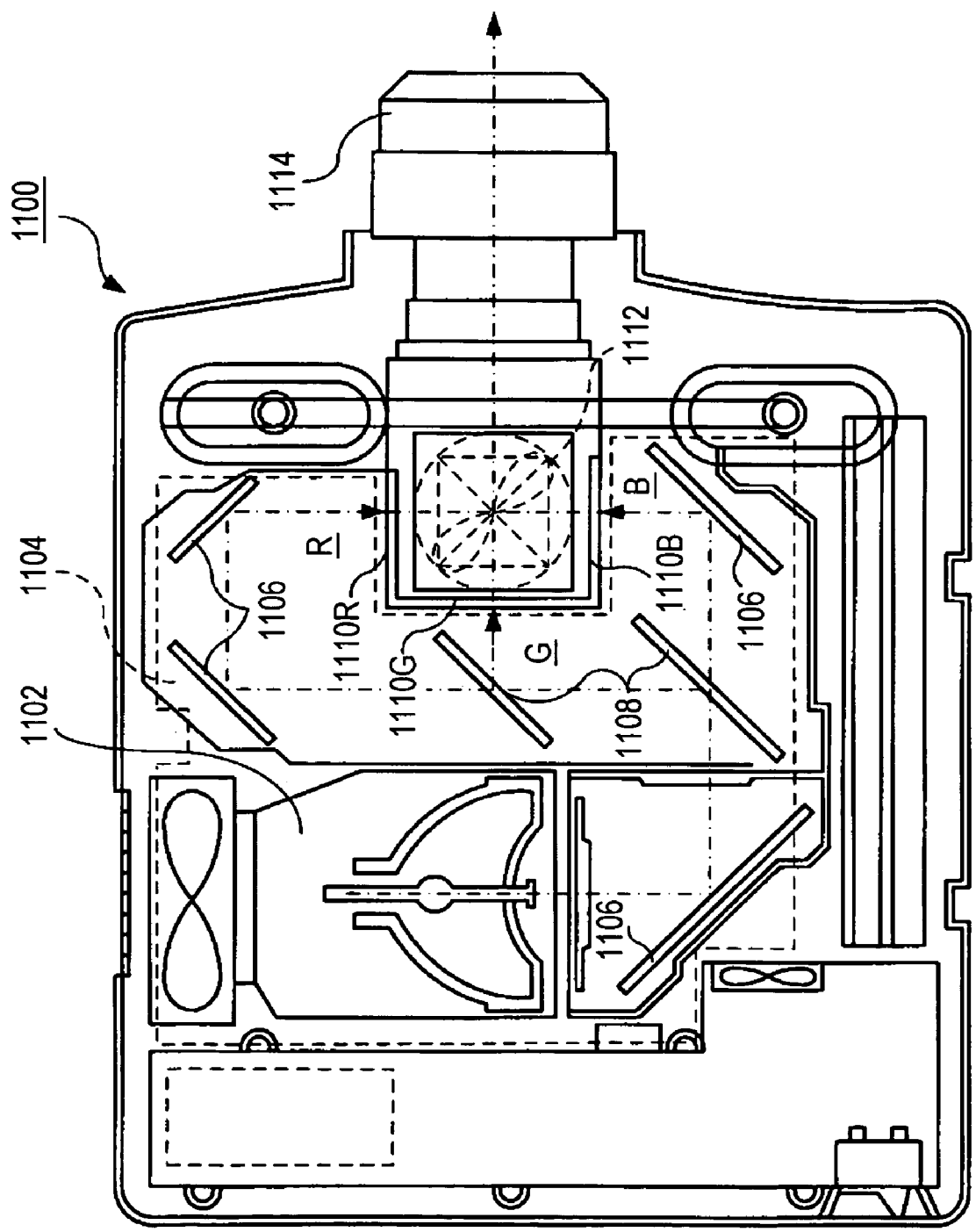
FIG. 6 is a plan view showing a configuration of a projector, which is an example of an electronic apparatus to which a liquid crystal device is applied.

First, a projector which uses the above-mentioned the liquid crystal device as a light valve will be described. FIG. 6 is a plan view showing a configuration of the projector. As shown in FIG. 6, the projector 1100 is provided with a lamp unit 1102 having a white light source, such as a halogen lamp, therein. Projection light emitted from the lamp unit 1102 is divided into three primary color light components of R, G, and B by four mirrors 1106 and two dichroic mirrors 1108 which are disposed in a light guide 1104, and the three primary color light components are introduced to light valves 1110R, 1110B and 1110G.

Here, a configuration of a liquid crystal panel 1110R, 1110B and 1110G is the same as that of the above mentioned liquid crystal device and are driven by primary color signals of R, G and B, respectively, which are supplied from the external circuit (not shown) to the external connection terminal 102. In addition, light components modulated by the liquid crystal panel are incident on a dichroic prism 1112 from the three directions. In the dichroic prism 1112, the R light component and the B light component are reflected by 90 degrees, while the G light component passes through straight. After a color image is synthesized from these colors, the color image is projected onto a screen through a projection lens 1114.

Here, considering the display form by the respective liquid crystal panel 1110R, 1110B and 1110G, it is necessary that the display form by the liquid crystal panel 1110G is mirror-revered with respect to the display form by the liquid crystal panel 1110R and 1110B.

Furthermore, since the light components corresponding to the respective colors of R, G and B are incident on the liquid crystal panel 1110R, 1110B and 1110G, respectively, through the dichroic mirrors 1108, no color filter is provided.

Mobile Computer

Figure 7:
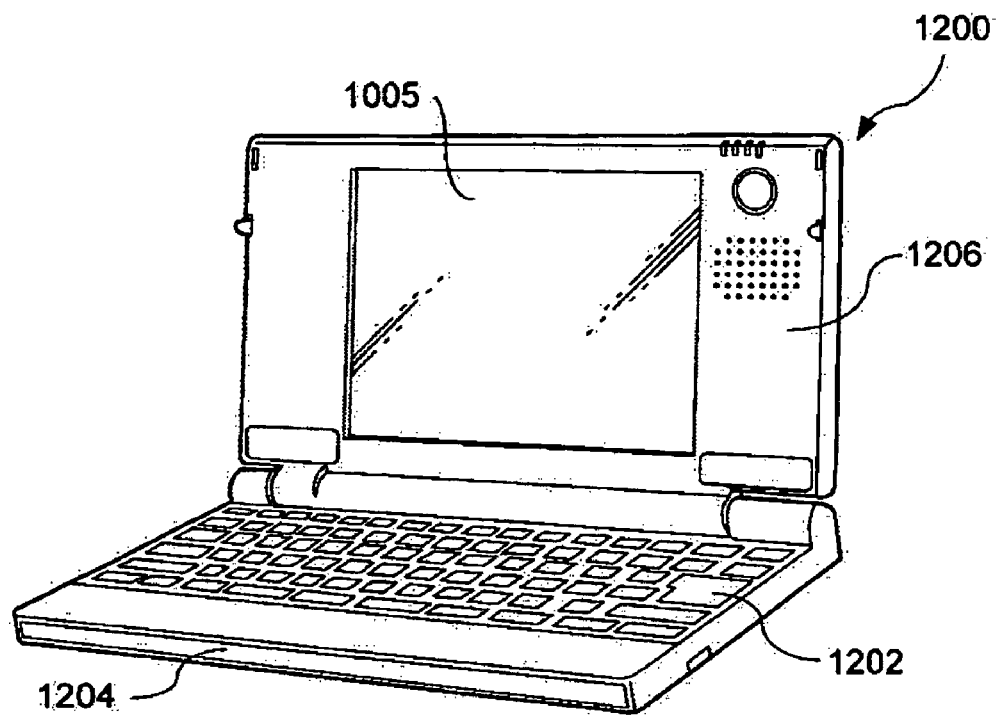
FIG. 7 is a perspective view showing a configuration of a personal computer, which is an example of an electronic apparatus to which a liquid crystal device is applied.

Next, an example in which the above-mentioned electro-optical device is applied to a mobile personal computer will be described. FIG. 7 is a perspective view showing a configuration of a personal computer. In FIG. 7, the computer 1200 is provided with a main body 1204 having a keyboard 1202 and a liquid crystal display unit 1206. The display panel 1206 is provided with a backlight at the back surface of the above-mentioned liquid crystal device 1005.

Cellular Phone

Figure 8:
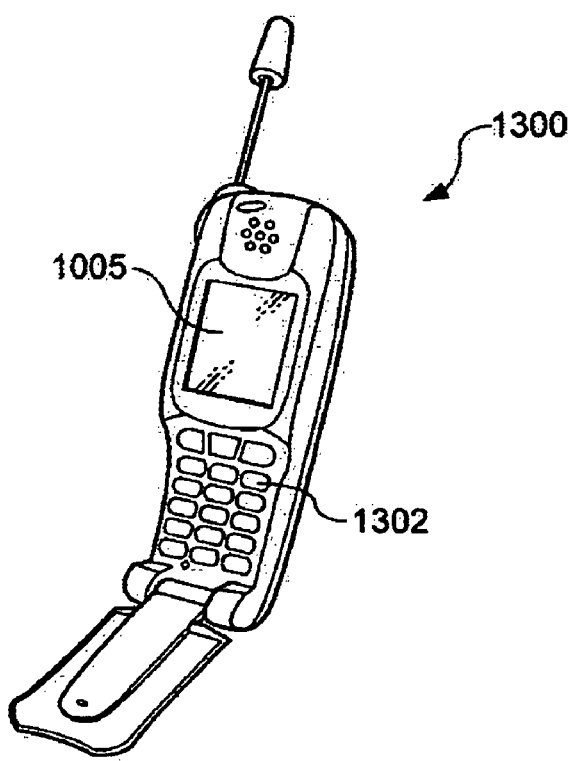
FIG. 8 is a perspective view showing a configuration of a cellular phone, which is an example of an electronic apparatus to which a liquid crystal device is applied.

In addition, an example in which the above-mentioned liquid crystal panel is applied to a cellular phone will be described. FIG. 8 is a perspective view showing a configuration of a cellular phone. In FIG. 8, the cellular phone 1300 is provided with a plurality of operation keys 1302, and a reflective liquid crystal device 1005. Moreover, the reflective liquid crystal device 1005 is also provided with a front light at the front surface thereof if necessary.

In addition to the apparatuses shown in FIGS. 6 to 8, examples of electronic apparatuses may include liquid crystal televisions, view-finder-type and monitor-direct-view-type video tape recorders, car navigation systems, pagers, electronic diaries, electronic calculators, word processors, workstations, videophones, POS terminals, and touch panels. Then, it is needless to say that the electro-optical device according to the above embodiment can be applied to these electronic apparatuses.

The present invention is not limited to the above embodiment, and appropriate modification can be made within the scope of the present invention, which can be found from the claims and the specification. The technical field of the present invention also includes an electro-optical device and an electronic apparatus according to modified embodiments.

What is claimed is:

1. An electro-optical device comprising a first substrate, a second substrate, and an electro-optical material between the first substrate and the second substrate, the first substrate comprising:
   a plurality of scanning lines and a plurality of data lines that intersect with each other;
   a plurality of pixel electrodes that are provided so as to correspond to the intersections of the plurality of scanning lines and the plurality of data lines;
   a sampling circuit that is disposed in a peripheral region positioned around the region in which the plurality of pixel electrodes are arranged, so as to correspond to the plurality of data lines disposed along an extending direction of a first side of the first substrate;
   a data line driving circuit that is disposed in the peripheral region and closer to the first side than the sampling circuit so as to supply a driving signal to the sampling circuit;
   at least one image signal terminal disposed in the peripheral region and closer to the first side than the data line driving circuit, the image signal terminal being supplied with a image signal externally;
   an image signal line that supplies the image signal to the sampling circuit, the image signal line extending from the image signal terminal, bypassing the data line driving circuit, and reaching the sampling circuit; and
   a vertical conduction terminal disposed near a second side intersecting with the first side of the first substrate, in the peripheral region, vertical conduction terminal enabling electrical conduction between the first substrate and the second substrate,
   wherein the image signal line has a first straight line portion extending in a direction of the second side and a second straight line portion extending in the direction of the first side, and an intermediate wiring portion connecting the first straight line portion and the second straight line portion,
   an angle of a corner formed between each of the first straight line portion and the second straight line portion and the intermediate wiring portion is an obtuse angle, and
   the intermediate wiring portion is wired to pass around the vertical conduction terminal.

2. The electro-optical device according to claim 1, wherein the vertical conduction terminal has a planar shape in which a side facing the intermediate wiring portion extends along the intermediate wiring portion as viewed in plan from the first substrate.

3. The electro-optical device according to claim 1 or 2, wherein the vertical conduction terminal is formed at a position opposite to a corner adjacent to an angular portion formed by the first side and the second side of the four corners of the first substrate.

4. The electro-optical device according to claim 1, wherein the image signal is formed of N image signals that are converted from serial to parallel (N being a natural number greater than or equal to 2), the image signal line is formed of N image signal lines disposed in parallel, which supply each of the N image signals, and each of the N image signal lines has the intermediate wiring portions disposed between the first straight line portion and the second straight line portion.

5. An electric apparatus comprising:
   the electro-optical device according to claim 1.

* * * * *